(12) United States Patent
Speropoulos

(10) Patent No.: US 9,896,021 B2
(45) Date of Patent: Feb. 20, 2018

(54) BOAT TRAILER LIGHT MOUNT ASSEMBLY

(71) Applicant: John Speropoulos, Miami, FL (US)

(72) Inventor: John Speropoulos, Miami, FL (US)

( * ) Notice: Subject to any disclaimer, the term of this patent is extended or adjusted under 35 U.S.C. 154(b) by 195 days.

(21) Appl. No.: 14/850,935

(22) Filed: Sep. 10, 2015

(65) Prior Publication Data
US 2016/0243978 A1 Aug. 25, 2016

Related U.S. Application Data

(60) Provisional application No. 62/048,574, filed on Sep. 10, 2014.

(51) Int. Cl.
*B60Q 1/32* (2006.01)
*B60Q 1/00* (2006.01)
*B60Q 1/26* (2006.01)
*B60Q 1/30* (2006.01)

(52) U.S. Cl.
CPC ......... *B60Q 1/0035* (2013.01); *B60Q 1/2661* (2013.01); *B60Q 1/305* (2013.01)

(58) Field of Classification Search
CPC .. B60Q 1/0035; F21W 2101/04; H01L 23/32; Y10T 403/73; Y10T 403/4608; Y10T 403/4691; Y10T 403/4694; E04H 2017/006; E04H 2017/1482; E04H 2017/1473
USPC ........... 362/431, 485, 549; 248/218.4, 219.2, 248/230.1, 314
See application file for complete search history.

(56) References Cited

U.S. PATENT DOCUMENTS

| | | | |
|---|---|---|---|
| 3,784,974 A | | 1/1974 | Hamashige |
| 3,885,146 A | * | 5/1975 | Whitley, Jr. ............... B60P 3/10 280/414.1 |
| 3,887,093 A | * | 6/1975 | Howell ................. B60P 3/1075 114/344 |
| 4,081,165 A | | 3/1978 | Fentress |
| 4,091,442 A | | 5/1978 | Markey |
| 4,234,908 A | | 11/1980 | McGee |
| 4,422,664 A | | 12/1983 | Poveromo |
| 4,860,177 A | * | 8/1989 | Simms ..................... B62J 6/003 315/76 |
| 5,537,299 A | | 7/1996 | Perry |

(Continued)

*Primary Examiner* — Jong-Suk (James) Lee
*Assistant Examiner* — Leah S Macchiarolo
(74) *Attorney, Agent, or Firm* — Calrie Marsh, Esq.; Calrie Marsh, P.A.

(57) ABSTRACT

A light mount assembly for coupling with a light fixture for attachment to the guide posts of a boat trailer. This invention focuses on an improved assembly for attaching light fixtures to the guide posts of boat trailers without reconfiguring the lighting system or the guide posts. The light mount assembly serves as a universal adapter for attaching brake or turning signal lights to the elevated position on the guide posts of a boat trailer. The assembly with its contiguous components provides a protective covering for the electrical wires of the light fixture and the coupled apparatus is easily attached to the guide posts using an adhesive, welding or screws as a fastening means. The light mount assembly requires little or no maintenance, is made from noncorrosive and durable material, and allows for the easy replacement of the light fixture without removal of the assembly form the guide posts.

4 Claims, 3 Drawing Sheets

(56) References Cited

U.S. PATENT DOCUMENTS

| | | | | |
|---|---|---|---|---|
| 5,544,022 | A | * | 8/1996 | Blackard ............... B60Q 1/305 |
| | | | | 362/431 |
| 5,980,073 | A | * | 11/1999 | Whipple ............... B60Q 1/305 |
| | | | | 362/269 |
| 6,007,033 | A | * | 12/1999 | Casson ................. B60D 1/485 |
| | | | | 248/224.7 |
| 6,409,367 | B1 | | 6/2002 | Pratt |
| 7,001,052 | B2 | | 2/2006 | Cullinan |
| 7,017,933 | B2 | | 3/2006 | Mickley |
| 7,108,408 | B2 | | 9/2006 | Tinklenberg |
| 7,581,857 | B1 | * | 9/2009 | Sisko ........................ B60P 3/10 |
| | | | | 362/398 |
| 7,628,519 | B2 | | 12/2009 | Purdy |
| 7,837,365 | B1 | * | 11/2010 | Sisko ........................ B60P 3/10 |
| | | | | 362/398 |
| D641,924 | S | * | 7/2011 | Daniels ...................... D26/138 |
| 8,978,573 | B2 | * | 3/2015 | McCluskey ........... B60P 3/1075 |
| | | | | 116/227 |
| 2005/0047156 | A1 | | 3/2005 | Cullinan |
| 2005/0237755 | A1 | * | 10/2005 | Vause ................... B60Q 1/305 |
| | | | | 362/485 |
| 2014/0355259 | A1 | * | 12/2014 | Ku ......................... F21S 9/037 |
| | | | | 362/183 |

* cited by examiner

BOAT TRAILER LIGHT MOUNT ASSEMBLY

CROSS-REFERENCE TO RELATED APPLICATIONS

This application claims the benefit of U.S. Provisional Application No. 62/048,574 filed on Sep. 10, 2014. The entire disclosure of this prior application is hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

The present invention relates generally to a device or apparatus for attaching a light fixture securely to the guide post(s) of a boat trailer.

BACKGROUND OF THE INVENTION

In the field of boating, the use of trailers to haul, load, launch, transport, and/or store boats has been standard for decades. There are different types of boat trailers including self-propelled, roll-on, or glide-path, which are respectively used depending on the size of the boat and the user's preferred method for launching or loading a boat. The process of loading or launching a boat onto a trailer often requires that the trailer is submerged into water as it is backed up to the boat. This creates a problem for boaters because typically the brake and turn signal lights are located at the rear left and right corners of the trailer. These light fixtures are routinely submerged into the water, which over time has a corrosive and deteriorating effect, including damage to the electrical wiring of these light fixtures. Replacing the brake and turning signals on boat trailers, as well has having to rewire electrical systems associated with these lighting fixtures, is expensive and laborious over time. However, these light fixtures are required by law and must be maintained in good working condition according to State and local regulations.

Most boat trailers have guide posts, sometimes referred to as guide poles, which literally function to guide the boat onto the trailer for efficient and proper loading or launching. There is prior art that teaches the attachment of lighting fixtures to guide posts in addition to or instead of at the rear corners of a boat trailer, however the mode of attachment still poses a problem for boaters. This invention focuses on an improved assembly for attaching the existing or additional light fixtures to the guide posts of boat trailers that, addressing problems still encountered by boaters, namely increased width of trailer area and problematic wind vaning.

The advantages of attaching the light fixtures to the guide posts are that the elevated position improves visibility for the user during loading; eliminates the routine and repeated submersion of the light fixtures into water; provides increased visibility to vehicles directly behind the trailered vessel: and increases safety by reducing the rate of rear end collisions, which has been determined by the National Transportation Safety Board (NTSB) based on their research in the auto industry.

SUMMARY OF THE INVENTION

The present invention, in contrast to prior art, focuses on the mode of attachment for the boat trailer light fixture to guide posts and not on recreating the lighting system. Most boat trailers come with standard brake, turning signal, or hazard lights located at the rear corners of the trailer. The existing modes and apparatus for attaching the light fixtures to the guide posts call for or require that a user purchase a new lighting system to take advantage of the elevated positioning of the light fixtures. The present invention allows a user to utilize standard light fixtures for attaching to the guide posts with ease and minimal expense. This invention is essentially a universal adapter for attaching existing or standard light fixtures to the guide posts of a boat trailer. The adaptability of this invention resolves the additional expense, labor, and reconfiguration required by the existing prior art.

BRIEF DESCRIPTION OF THE DRAWING(S)

In describing the invention, reference will at times be made to the accompanying drawings in which.

DESCRIPTION OF THE INVENTION

Before the subject invention is described further, it is to be understood that the invention is not limited to the particular embodiments of the invention described below, as variations of the particular embodiments may be made and still fall within the scope of the invention. It is also to be understood that the terminology employed is for the purpose of describing particular embodiments, and is not intended to be limiting.

The details of one or more embodiments of the invention are set forth in the accompanying drawings and the description below. Other features, objects, and advantages of the invention will be apparent from the description and drawings, and from the claims. In the following description, numerous specific details are set forth to provide a thorough understanding of the embodiments. One skilled in the art to which this invention belongs will recognize, however, that the techniques described can be practiced without one or more of the specific details, or with other methods, components, materials, etc. In other instances, well known structures, materials or operations are not shown or described in detail to avoid obscuring certain aspects.

In this specification, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

Figure 1:
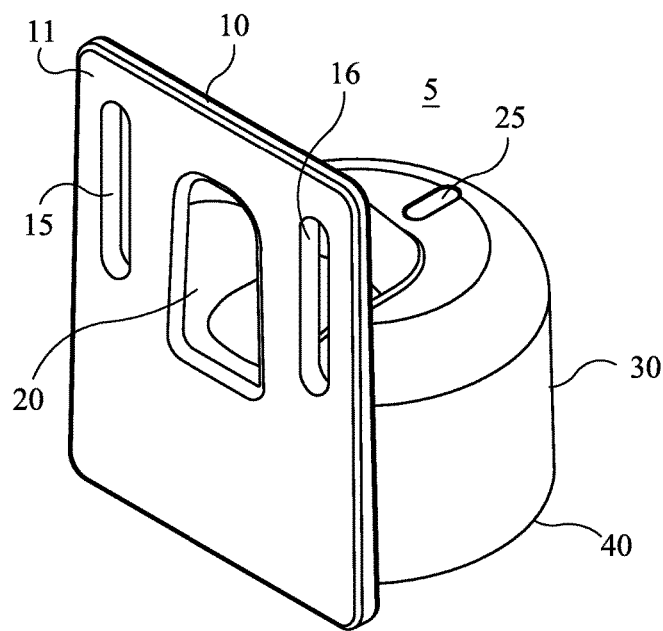
FIG. 1 is a anterior perspective view of the invention and its components.
Figure 2:
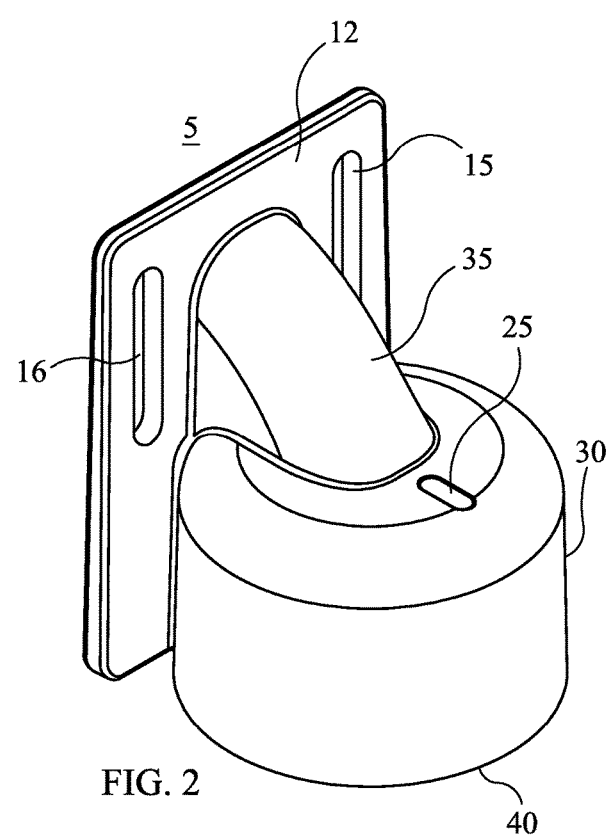
FIG. 2 is a rear perspective of the invention and its components.

The present invention is a boat trailer light mount assembly which serves as a universal adapter for attaching a light fixture to the guide posts of a boat trailer. FIGS. 1 and 2 illustrate the components of the assembly 5 which comprise a backing 10, which has an anterior side 11 and a posterior side 12; two points of attachment 15 and 16; an interior housing 20 which has an opening in the center of the backing 10; the exterior of the housing 30 which is cylindrical and extends from the posterior side 12 of the backing 10; an airflow opening 25 positioned on the exterior housing; and a dome shaped covering 35 which starts near the top of the posterior side 12 of the backing 10 and forms a contiguous connection to the upper most portion of the exterior housing 30. The complete assembly 5 is attached to a guide post at the base 40 of the exterior housing 30.

As illustrated in FIGS. 1 and 2, the backing 10, 11, and 12 is square in shape and is designed to have the dimensions of the corresponding backing/surface of the light fixture. The shape of the backing 10 is adaptable to the shape of the corresponding backing of the light fixture in that it has a flat smooth surface and may be rectangular or circular. The anterior side 11 of the backing 10 serves as the point of interface between the assembly 5 and the light fixture. The two openings 15 and 16 serve as the point of attachment of the assembly 5 to the light fixture using screws or nuts and bolts to securely fasten the light fixture to the assembly 5. The openings 15 and 16 are oblong or oval in shape and are adaptable in size and dimension based on the size and dimension of the light fixture being attached. The light fixtures on most trailers are designated right-side or left-side and will only attach properly to the designated side of the trailer. The oblong shape of the openings 15 and 16 further adds to the adaptability of the assembly because it allows for the attachment of the light fixture regardless of whether it is designated for the right side or left side of the trailer. The oblong points of attachment 15 and 16 of the assembly 5 allows for adjusting in the upward or downward position to accommodate the right or left designation of the light fixture. Additionally, the light fixture does not require any alteration or resizing before attaching to the assembly; and the attachment of the light fixture to the assembly does not require any heavy duty or complicated tools—only a basic wrench or hand tool for tightening the nuts and bolts or screws.

Figure 3:
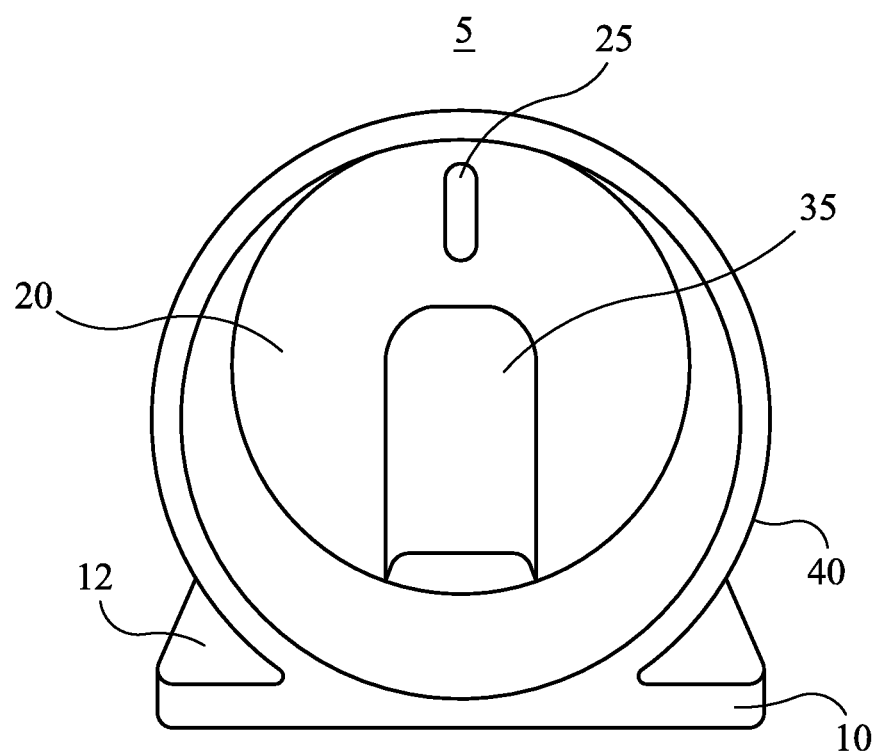
FIG. 3 is a bottom perspective view of the invention.
Figure 4:
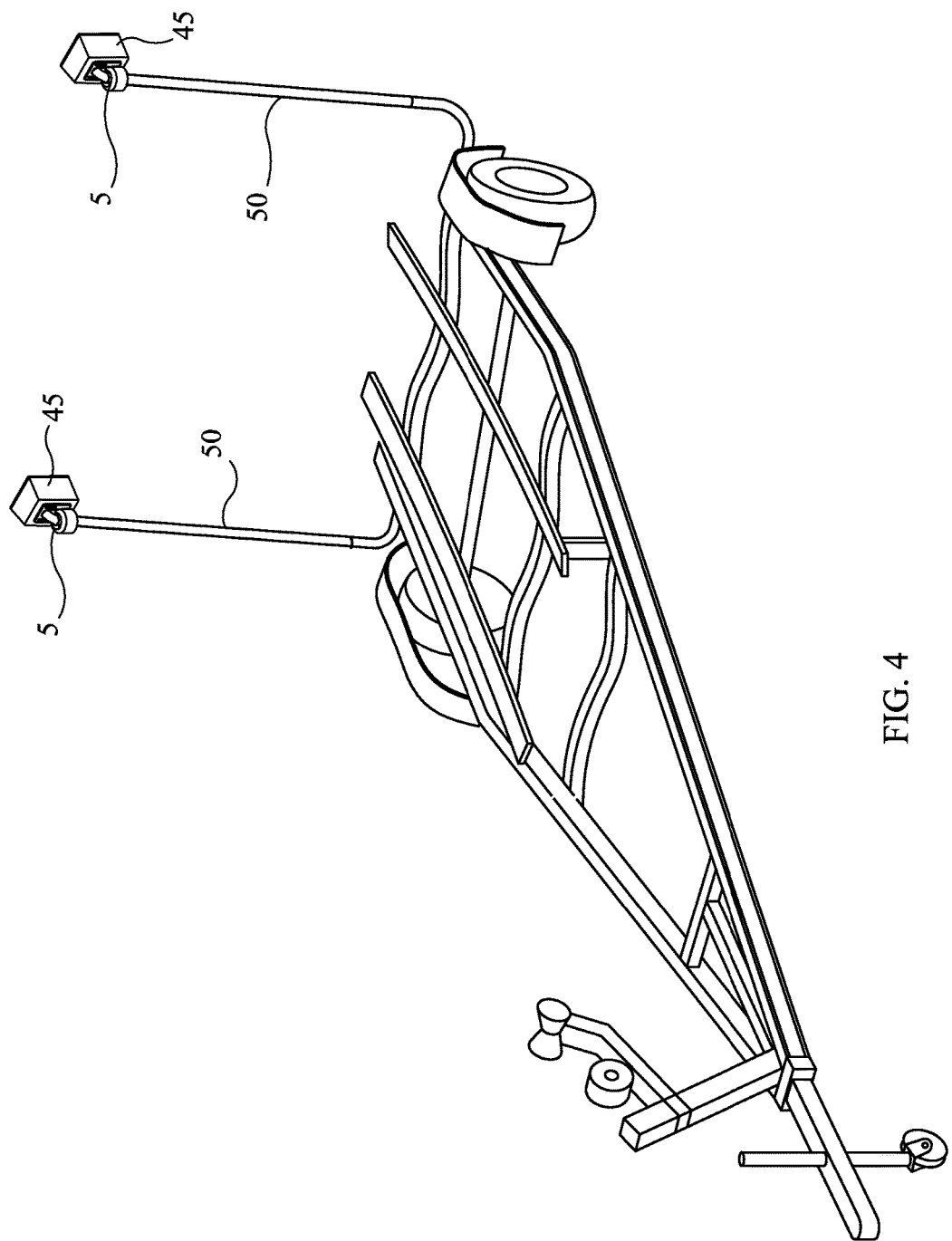
FIG. 4 is an illustration of the invention as it is attached to the guide posts of a trailer.

The interior housing 20 is hollow and serves as a repository for the electrical wiring connected to the light fixture as shown FIG. 3. The dome covering 35 and the exterior housing 30 are means for protecting the electrical wiring of the light fixture from the elements or other damage. The airflow vent 25 of the assembly is designed to facilitate air flow through the guide posts and the assembly 5. The airflow vent is useful and effective for decreasing the buoyancy of the guide posts during the loading and launching process. Once the light fixture is securely fastened to the assembly 5, the combined apparatus is attached to the guide posts of a boat trailer at the base 40 of the exterior housing 30, as illustrated in FIG. 4. The exterior housing 30 is cylindrical in shape and is designed to have a circumference that is slightly larger than the circumference of the guide posts to ensure a snug fit, as illustrated in FIG. 4. The attachment of the assembly 5 to the guide posts may be secured by permanent glue, PVC cement, or other suitable adhesive. Alternatively, the assembly 5 may be permanently attached to the guide posts by other means including welding or other methods of fusing the assembly 5 to the guide posts. In other embodiments, the assembly 5 may be removable from the guide posts for easy storage or other purpose where the attachment is not achieved by permanent means. The removable assembly 5 would be fashioned to fit snugly and securely to the guide posts, allowing easy removal by twisting or pulling off from the guide posts. Alternatively, the assembly 5 may be removable by using small screws to fasten and secure it to the guide posts, allowing the user to unscrew with ease if desired.

The assembly 5 is one continuous apparatus with contiguous components and is made of PVC or other durable plastic material which is corrosion resistant and able to withstand the deteriorating effects of the elements. In the preferred embodiment of this invention, the assembly 5 is made of PVC which is the same material used for most guide posts. The assembly 5 and its components are adaptable not only to the size and dimensions of light fixtures, but to the size and dimensions of guide posts. The circumference of the exterior housing 30 may be customized to fit the dimensions of a guide post that is smaller or larger than the standard. Thus the assembly 5 is sturdy, adaptable, and easy to use.

It is to be understood, that the subject invention described herein is not limited to the particular embodiments of the invention described herein, as variations of the particular embodiments may be made and still fall within the scope of the invention as described herein. It is also to be understood that the terminology employed is for the purpose of describing particular embodiments, and is not intended to be limiting.

As various changes can be made in the above-described subject matter without departing from the scope and the spirit of the invention, it is intended that all subject matter contained in the above description, shown in the accompanying drawings, or defined in the appended claims will be interpreted as descriptive and illustrative, and not in a limiting sense. Many modifications and variations of the present invention are possible in light of the above teachings. It is therefore to be understood that within the scope of the appended claims, the invention may be practiced otherwise than as specifically described.

EQUIVALENTS

Those skilled in the art will recognize, or be able to ascertain using no more than routine experimentation, many equivalents to the specific embodiments of the invention described herein. Such equivalents are intended to be encompassed by the claims.

What is claimed is:

1. A light mount assembly for attachment to a guide post of a boat trailer comprising:
   A backing having an anterior and posterior side, which anterior side serves as the interface between a light fixture and the light mount assembly;
   Two points of attachment for the light fixture located at the upper right and upper left corner of the backing, which points of attachment are oblong in shape and adaptable to the right or left position designation of the light fixture;
   A hollow interior housing having an opening on the anterior side of the backing and extends outward from the posterior side of the backing;
   An exterior housing which extends from the posterior side of the backing and is cylindrical;
   A dome covering that extends from near the top of the posterior side of the backing, flowing contiguously to the uppermost portion of the exterior housing;
   An airflow vent located on the upper most portion of the exterior housing to facilitate the flow of air through the guide post and the light mount assembly; and
   A hollow base for attaching the light mount assembly couple with the light fixture to the guide posts of the boat trailer.

2. The light mount assembly in claim 1, where the size and shape of the backing is adaptable to the dimensions of the light fixture.

3. The light mount assembly in claim 1, where the attachment to the guide posts is achieved by permanent means.

4. The light mount assembly in claim 1, where the attachment to the guide posts is removable.

\* \* \* \* \*